Feb. 6, 1945. T. R. HARRISON 2,368,830
SENSITIVE RELAY MECHANISM
Filed April 13, 1942 4 Sheets-Sheet 1

INVENTOR.
Thomas R. Harrison
BY George H. Fisher
Attorney

Feb. 6, 1945.　　　　T. R. HARRISON　　　　2,368,830
SENSITIVE RELAY MECHANISM
Filed April 13, 1942　　　　4 Sheets-Sheet 4

INVENTOR.
Thomas R. Harrison
BY
George H. Fisher
Attorney

Patented Feb. 6, 1945

2,368,830

UNITED STATES PATENT OFFICE 2,368,830

SENSITIVE RELAY MECHANISM

Thomas R. Harrison, Wyncote, Pa., assignor to Minneapolis-Honeywell Regulator Company, Minneapolis, Minn., a corporation of Delaware Application April 13, 1942, Serial No. 438,753

22 Claims. (Cl. 236—70)

The present invention relates to sensitive relay mechanisms, and particularly to such devices which perform a control function in accordance with the position of a sensitive measuring element, as, for example, a galvanometer pointer.

When it is desired to construct a sensitive control system for maintaining a condition at a desired value, a common expedient is to provide a balanced electrical circuit, including an element which causes unbalance of the circuit whenever the condition departs from the desired value. A galvanometer is connected in the circuit so as to deflect in one direction or the other from a neutral position in accordance with the variations in the controlling condition. In order to operate relatively heavy control apparatus, for example, a valve, in accordance with the position of the galvanometer pointer, it is customary to provide a mechanism which periodically clamps the pointer, and then drives a secondary element into engagement with the pointer so as to establish a position of the secondary element which reflects the position of the clamped pointer. The mechanism then applies a brake to the secondary element to retain it in its established position, and drives the secondary element bodily into engagement with a control member so as to perform a control function in accordance with the position of the secondary element. For example, the secondary element may be made to operate a switch in an electrical circuit for energizing the apparatus under control. When the secondary element is disengaged from the pointer, the latter is unclamped so as to be free to move in accordance with variations in the controlling condition.

An object of the present invention is to provide an improved and simplified mechanical relay mechanism of the type disclosed in the patent of Willis H. Gille, No. 2,331,182, dated October 5, 1943.

Another object of the invention is to provide an improved and simplified relay mechanism of the type wherein a secondary element is periodically positioned in accordance with the position of a sensitive measuring element, and the secondary element is then utilized to perform a control function in accordance with its position.

A further object is to construct a sensitive relay mechanism of the type described including an improved braking mechanism for retaining the secondary element in the position established by the sensitive measuring element during the performance of the control function.

A further object of the present invention is to provide, in such a device, means including a single cam and follower for braking the secondary element and for driving it between the galvanometer pointer and the control element.

A further object of this invention is to provide, in such a device, means including a single cam and follower for clamping the galvanometer pointer, operating and releasing the brake on the secondary element, and driving the secondary element between the galvanometer pointer and the control element.

Another object of the invention is to provide an improved control element for engagement by the secondary element, wherein the form of the control element is such that the time of engagement of the two elements is modulatingly varied in accordance with the position of the secondary element.

Other objects and advantages of my invention will appear from an inspection of the accompanying specification, claims, and drawings, in which:

Figure 1:
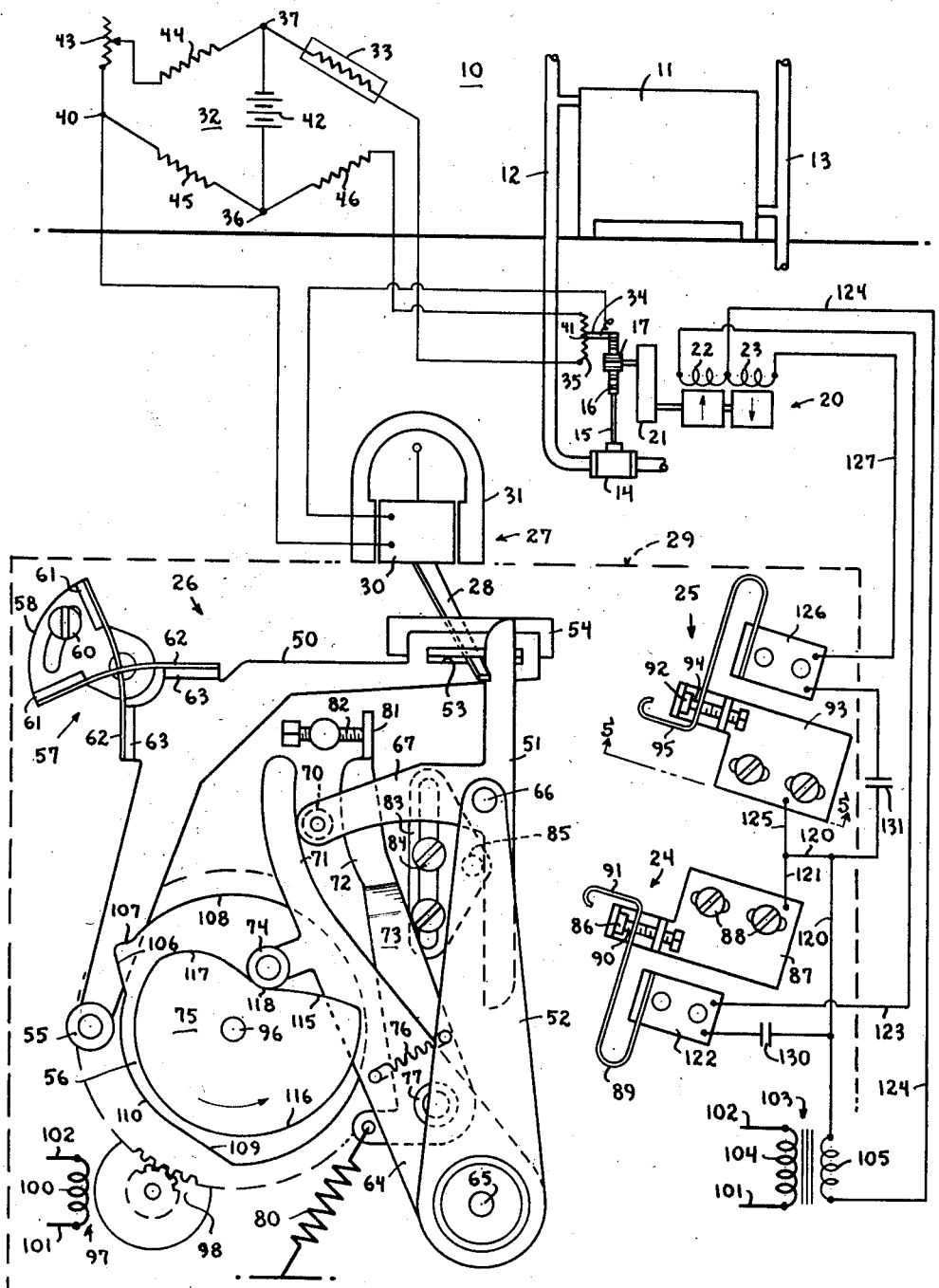
Figure 1 is a somewhat diagrammatic view of a control system embodying a preferred embodiment of my invention.

Figure 1 shows a system for controlling the supply of heat to a space 10. A radiator 11, located in the space 10, is supplied with a heating fluid, for example, steam, through a pipe 12. Exhausted fluid is drawn off from the radiator 11 through a return pipe 13. The supply of heating fluid to the radiator 11 is controlled by a valve 14 in the supply pipe 12.

Any suitable mechanism may be provided for controlling the position of the valve 14. For example, the valve 14 is shown as having a stem 15 attached to a rack 16. The rack 16 is moved by a pinion 17 which is driven by a motor 20 through a gear train schematically indicated at 21. The motor 20 is provided with a pair of field windings 22 and 23, which when energized cause rotation of the motor in opposite directions. Energization of the windings 22 and 23 is controlled by switches 24 and 25, respectively.

Switches 24 and 25 are selectively operated by a sensitive relay mechanism 26 which is mounted on a supporting plate indicated schematically at 29. The relay mechanism 26 is in turn controlled by a galvanometer 27.

Galvanometer 27 consists of a pointer 28 carried by a moving coil 30 which is suspended between the poles of a permanent magnet 31. The pointer 28 normally rests in a neutral position, and is deflected therefrom in accordance with the unbalance of a bridge circuit 32 to which the coil 30 is connected. One arm of the bridge circuit 32 includes a resistor 33 of some material having an appreciable temperature coefficient of resistance. The resistor 33 is exposed to the temperature in the space 10, so that its resistance varies in accordance with the changes in the temperature of the space 10.

The rack 16 carries a slider 34 which is moved relatively to a slide wire resistance 35 in accordance with the position of the valve 14.

The bridge circuit 32 includes a pair of input terminals 36 and 37, and a pair of output terminals 40 and 41. Output terminal 41 is the point at which the slider 34 engages the slide wire 35. A suitable source of electrical energy, shown as a battery 42, is connected between the input terminals 36 and 37. The coil 30 of the galvanometer 27 is connected between the output terminals 40 and 41.

The upper left-hand arm of the bridge 32, as it appears in the drawings, includes a variable resistance 43 and a fixed resistance 44. The upper right arm of the bridge 32 includes the temperature responsive resistance 33 and a portion of the slide wire resistance 35. The lower left arm of the bridge includes a fixed resistance 45. The lower right arm of the bridge includes a fixed resistance 46 and the remaining portion of the slide wire resistance 35.

The resistance 43 may be manually adjustable, and its purpose is to establish the temperature in the space 10 at which the bridge circuit will be balanced when the valve 14 is in a given position. In other words, the function of the variable resistance 43 is to set the control point of the system.

The sensitive relay mechanism 26 comprises means including a lever 50 for clamping the galvanometer pointer 28, a secondary pointer 51 which is periodically positioned in accordance with the position of the clamped pointer and is then moved to selectively actuate the switches 24 and 25 in accordance with its position, mechanism including a supporting arm 52 for carrying the secondary pointer 51 and for moving it alternately into engagement with the clamped pointer 28 and with the switches 24 and 25, and a braking arrangement for maintaining the position of the secondary pointer 51 with respect to its supporting arm 52.

The galvanometer clamping lever 50 has an elongated opening 53 in one of its ends, through which opening the pointer 28 passes. Immediately in back of the opening 53, the pointer 28 passes under a stationary bar 54. The opposite end of the clamping lever 50 carries a follower 55 which cooperates with a cam 56. The lever 50 is supported at an intermediate point by means of a crossed spring pivot arrangement 57.

The cross spring pivot 57 is of a conventional type, and comprises a bracket 58 attached to the mounting plate 29 by means of a pin and slot connection 60. The bracket plate 58 has a pair of upstanding lugs 61, to which are attached, as by welding or riveting, a pair of normally flat springs 62. The opposite ends of the spring members 62 are attached to similar upstanding lugs 63 on the clamping lever 50. The central portions of the springs 62 are spaced from each other so that there is no friction between them.

The supporting arm 52 and a brake arm 64, hereinafter referred to as the primary brake arm, are journalled on a stub shaft 65 attached to the mounting plate 29. The arm 52 pivotally supports, as at 66, the secondary pointer 51. The pointer 51 comprises an elongated vertical portion and a lateral extension 67 appearing to the left of the pivot 66.

The extension 67 carries a brake shoe 70 in the form of a circular pin, which is attached to its rear surface. The pin 70 is adapted to be clamped between an arcuate surface 71 on the primary brake arm 64 and an arcuate surface 72 on a secondary brake arm 73. The center of curvature of these arcuate surfaces is the center of rotation of secondary pointer 51 which carries brake shoe pin 70. The primary brake arm 64 carries at an intermediate point a follower 74 which cooperates with a cam 75. A tension spring 76 biases supporting arm 52 and primary brake arm 64 for movement towards each other. The secondary brake arm 73 is pivotally attached to the primary brake arm 64, as at 77. A tension spring 80, one end of which is fixed, has its other end connected to the secondary brake arm 73 so as to tend to rotate the secondary brake arm in a counter-clockwise direction about its pivot 77. The secondary brake arm 73 carries on its upper end an extension 81 which cooperates with an adjustable stop 82 mounted on the plate 29. When the extension 81 is engaging the stop 82, counter-clockwise movement of the secondary brake arm 73 about its pivot 77 is prevented, and at such times the effect of the spring 80 is to rotate the primary brake arm 64 in a counter-clockwise direction about its pivot 65. The spring 80 is made stronger than the spring 76 in order that it may, at such times, overcome the effect of spring 76 and cause relative movement of the primary brake arm 64 and the supporting arm 52.

A plate 83 is adjustably supported on the plate 29 by means of a pin and slot connection 84. This plate 83 carries a stop pin 85, which projects forwardly into the path of movement of the lower end of the elongated vertical portion of the secondary pointer 51.

Switch 24 comprises a stationary contact 86 which is adjustably mounted with respect to the mounting plate 29 by means of a screw and slot connection 88, and a movable contact 80 mounted on a long flexible switch finger 89. The switch finger 89 has an angular extension 91 which lies in the path of the secondary pointer 51 as it is moved to the right by the operation of the driving mechanism. Switch 25 similarly comprises a stationary contact 92 mounted adjustably with respect to plate 29 and a movable contact 94 mounted on a long flexible finger 95.

Figure 5:
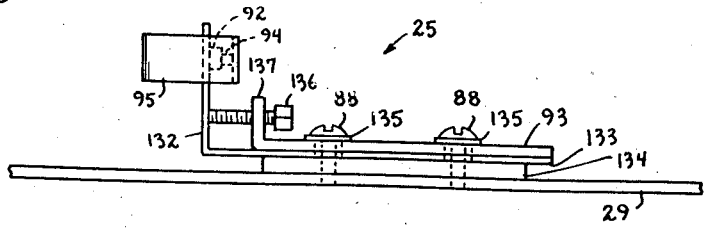
Figure 5 shows a view taken along the line 5—5 of Figure 1, looking in the direction of the arrows.

Figure 5 shows in detail the supporting structure of stationary contact 92 of switch 25. It will be seen that contact 92 is mounted on an upstanding leg 132 of a bracket plate 133, of flexible material. A heavier bracket plate 93 overlies the plate 133, which is spaced from the mounting plate 29 by a suitable insulation piece 134. Screws 88 pass through holes in the plates 93 and 134, and threadedly engage insulation piece 134 and plate 29. Insulating washers 135 separate the heads of screws 88 from plate 93. The holes in the plate 93 not only electrically separate the screws 88 from the plates 93 and 133, but also permit a rough adjustment of contact 92 relative to plate 93. Fine adjustment of contact 92 is controlled by a bolt 136, which is threaded through an upstanding lug 137 on the plate 93. The leg 132 of plate 133 is self-biased to engage the end of bolt 136. The position of contact 92 relative to plate 93 may therefore be finely adjusted by turning bolt 136.

A condenser 130 is connected across the contacts of switch 24, and a condenser 131 is connected across the contacts of switch 25, for spark prevention purposes.

The cams 56 and 75 are mounted on a common shaft 96 which is continuously rotated by a constant speed motor 97 through a gear train schematically indicated at 98. The motor 97 is provided with a winding 100 connected to power supply lines 101 and 102.

Energy for the operation of motor 20 is supplied through a transformer 103 having a primary winding 104 and a secondary winding 105. The primary winding 104 is connected to suitable power supply lines which may be connected with lines 101 and 102, although such connection is not shown in the drawings.

*Operation of Figure 1*

When the parts are in the positions shown in the drawings, the temperature of the space 10 is at the value at which it is desired to maintain. Bridge circuit 32 is balanced, and the galvanometer pointer 28 is at a position in the center of its range of travel. The valve 14 is approximately half open, as indicated by the fact that the pinion 17 is engaging the rack 16 at a point approximately midway of its length.

In the sensitive relay mechanism 26, cams 75 and 56 are rotating counter-clockwise, as indicated by the legend in the drawings, and have reached a position such that the galvanometer pointer 28 has been clamped and the secondary pointer 51 has been moved into engagement with the clamped pointer 28. The angular position of the secondary pointer 51 with respect to its supporting arm 52, is at this time determined by the positions of the clamped pointer 28, and the stop pin 85, which engage the upper and lower extremities respectively of the elongated vertical portion of the pointer 51. Engagement of pointer 51 with pointer 28 and stop 85 has prevented further movement of pivot 66 to the left. Therefore supporting arm 52 remains stationary. Primary brake arm 64 has moved on to the left under the influence of spring 80 acting through the pivot 77 to maintain follower 74 in engagement with cam 75. The extension 81 of secondary brake arm 73 has engaged stop 82, so that brake shoe 70 is free from secondary brake surface 72. The continued movement of primary brake arm 64 to the left has also freed brake shoe 70 from surface 71. Therefore, secondary pointer 51 has been freed to assume a position with respect to supporting arm 52 which is determined only by the relative positions of stop 85 and the clamped pointer 28.

As the motor 97 continues to rotate, the cam 56 is driven in a counter-clockwise direction from the position shown in the drawings, and the follower 55 successively moves up a riser portion 106, down a drop-off portion 107, along a dwell portion 108, and down a drop-off portion 109. A low dwell portion 110 connects the drop-off portion 109 with the riser portion 106, but the bracket 58 which supports the clamping lever 50 is so adjusted with respect to the plate 29 by means of screw and slot connection 60, that when the bottom edge of the aperture 53 engages the pointer 28 to clamp it against the bar 54, the follower 55 is held free of the low dwell portion 110.

When the follower 55 moves up the riser 106, the lever 50 is rotated clockwise about its pivot, thereby moving the aperture 53 downwardly and freeing the pointer 28. As the follower 55 reaches the upper end of riser 106, the upper end of the aperture 53 moves down below the lower edge of the bar 54, thereby giving pointer 28 a slight downward kick, which serves to free it in case it adheres to the bar 54.

When the follower 55 moves down the drop-off portion 107, the upper edge of aperture 53 moves back in front of the bar 54 so as to avoid frictional engagement between the pointer 28 and the sides of the aperture 53.

When the follower 55 moves along the dwell portion 108, the pointer 28 is free to move within the aperture 53, and is then fully responsive to the unbalance condition of the bridge circuit 32.

When the follower 55 moves down the drop-off portion 109, being biased toward the cam by the cross springs 62, the lever 50 is moved counter-clockwise about its crossed spring pivot and the bottom edge of the aperture 53 again moves upwardly and engages the pointer 28, clamping it against the bottom of the bar 54. The pointer 28 remains clamped while the low dwell portion 110 passes the follower 55.

As cam 75 rotates in a counter-clockwise direction from the position shown in the drawings, follower 74 moves successively up a riser portion 115, down a long slow drop-off portion 116, and then down a rapid drop-off portion 117 to a short low dwell portion 118.

The follower 74 is shown in the drawings as engaging the low dwell portion 118. When follower 74 moves up the riser portion 115, the primary brake arm 64 is rotated clockwise about its pivot. This brings braking surface 71 into engagement with brake shoe 70, and after this engagement the secondary pointer 51 and supporting arm 52 are moved to the right by the force supplied from the primary brake arm 64 through the brake shoe 70. As the motion of primary brake arm 64, pointer 51, and supporting arm 52 continues to the right, the brake shoe 70 engages the brake surface 72 on the secondary brake arm 73. This engagement picks up the extension 81 from the stop 82 and thereafter the whole assembly consisting of supporting arm 52, secondary pointer 51, and brake members 64 and 73 moves about the pivot 65 as a unit. When the follower 74 reaches the upper extremity of riser 115, the secondary pointer 51 is at its extreme limit of movement to the right.

When the secondary pointer 51 reaches its extreme right-hand position, it engages and operates either switch 24 or switch 25, or neither, depending upon the angular position of pointer 51 with respect to its supporting arm 52. When the angular position of pointer 51 with respect to supporting arm 52 is that shown on the drawings, it will engage neither switch 24 nor 25. If the secondary pointer 51 were displaced in a counter-clockwise direction about the pivot 66 from the position shown in the drawings, the lower end of the pointer 51 would engage extension 91 of switch finger 89, thereby opening switch 24, but switch 25 would not be operated. On the other hand, if the secondary pointer 51 were displaced in a clockwise direction from the position shown, the upper end of the pointer 51 would engage and operate switch 25, but switch 24 would not be operated.

It should therefore be seen that the sensitive relay mechanism selectively operates switches 24 and 25, depending upon the direction in which the pointer 28 is displaced from its neutral position. The riser portion 115 of cam 55 is rather abrupt, so as the follower 74 moves along it, the pointer 51 is moved rapidly into engagement with the switches 24 or 25. Therefore the moment of engagement of pointer 51 with either switch 24 or 25 is determined largely by the riser portion 115, and not by the angular position of pointer 51 with respect to the supporting arm 52. The slope of the drop-off portion 116 is rather gentle, however, so that the pointer 51 is moved slowly away from contacts 24 and 25. Therefore the switch 24 or 25 will be actuated for a period of time, represented by an arc on the surface of cam 75, which is dependent upon the angular position of secondary pointer 51 with respect to supporting arm 52. While the length of this period of time is also determined by the speed of the motor 97 and the shapes and sizes of the various cooperating elements of the mechanism, these factors are constant and hence do not cause any change in the length of this period.

Since the motor 97 operates at a constant speed, it should further be apparent that the length of time during which the switches 24 or 25 are operated by the pointer 51 is determined by the magnitude of the deflection of pointer 28 from its neutral position, which of course determines the angular deflection of the secondary pointer 51 from its normal neutral position.

When the follower 74 reaches the end of the slow drop-off portion 116 and moves down the rapid drop-off portion 117, the secondary pointer and its related parts are moved rapidly to the left so as to again release the braking mechanism and position the secondary pointer 51 in accordance with the position attained by the pointer 28 during the interval when it was free to move. As this movement takes place, the extension 81 is again picked up by the stop 82, thereby releasing brake shoe 70 from the braking surface 72. When primary brake arm 71 moves on, freeing shoe 78 from braking surface 71, the secondary pointer 51 is again free to be positioned by the stop 85 and the pointer 28. The whole cycle of relay operation is then repeated.

Switch 24 controls an energizing circuit for motor winding 22, which may be traced from the upper terminal of transformer secondary winding 105 through conductors 120 and 121, bracket plate 87, stationary contact 86, movable contact 90, flexible switch finger 89, a bracket 122, a conductor 123, winding 22, and a conductor 124 to the lower terminal of secondary winding 105.

Switch 25 controls an energizing circuit for winding 23 of motor 20, which may be traced from the upper terminal of secondary winding 105, through conductor 120, a conductor 125, bracket plate 93, stationary contact 92, movable contact 94, flexible switch finger 95, a bracket 126, a conductor 127, winding 23, and conductor 124 to the lower terminal of secondary winding 105.

It should be noted that both switches 24 and 25 are normally closed, so that opposing windings 22 and 23 of motor 20 are normally energized. When one of the switches 24 and 25 is opened, one of the windings 22 and 23 is deenergized and the other causes rotation of the motor. When, in the course of operation of the relay mechanism, the switch which was opened again closes, both circuits are complete, and a sort of dynamic braking action is obtained which stops the motor quickly, thus overcoming any tendency to overrun due to the inertia of the rapidly moving motor.

Let it now be assumed that the temperature in the space 10 increases above the value which it is desired to maintain. This causes an unbalance of the bridge circuit 32 in such a direction as to cause a flow of current from output terminal 41 to output terminal 40. This flow of current causes a deflection of galvanometer pointer 28 to the left of the position shown in the drawings. When the pointer 51 is next positioned in the course of the operation of the sensitive relay mechanism 26, it is set at a position displaced in a counterclockwise direction with respect to supporting arm 52 from the position shown in the drawings. When the secondary pointer 51 is moved to the right, its lower end engages the switch 24, thereby deenergizing motor winding 22. Motor winding 23 then causes rotation of motor 20 in a direction such as to close the valve 14 slightly, thereby moving slider 34 downwardly along the slide-wire 35 and decreasing the resistance in the upper right-hand arm of the bridge circuit, so as to restore the bridge to a condition of balance. When the pointer 28 is next clamped by the relay mechanism 26, it will again be in its balanced position, and the switches 24 and 25 will not be actuated further. If the departure of the temperature in the space 10 from the desired value persists, however, the switch mechanism will continue to be periodically actuated until such time as the position of valve 14 has been corrected sufficiently to overcome the change in temperature of the space 10.

Similarly, a drop in temperature in the space 10 will cause deflection of galvanometer pointer 28 to the right, with the resultant opening of switch 25 and operation of the valve 14 towards open position so as to increase the supply of heat to the space 10, thereby overcoming the drop in temperature.

Figure 2:
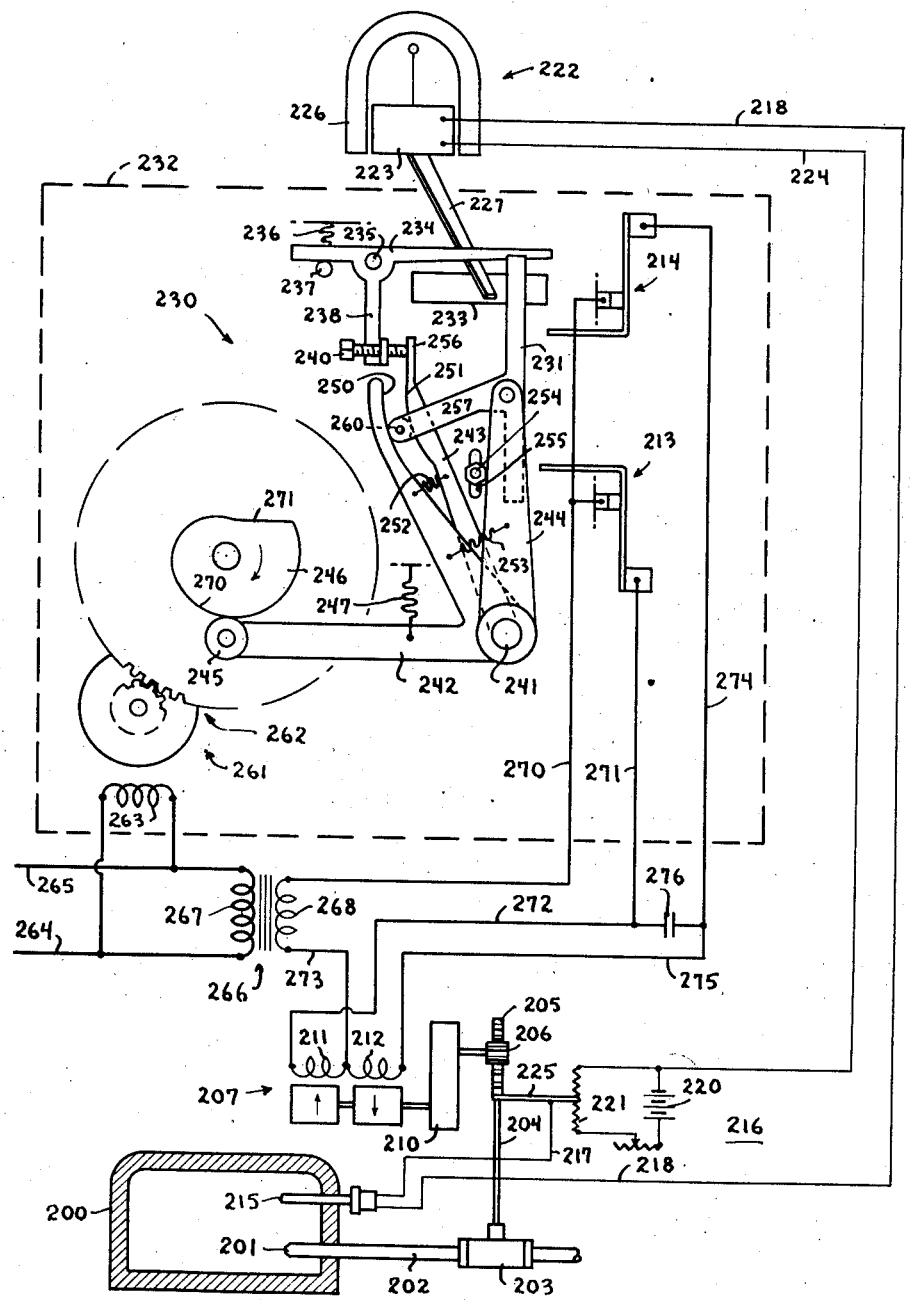
Figure 2 is a somewhat diagrammatic view of another control system employing a different embodiment of my invention.

*Figure 2*

Figure 2 shows a somewhat different type of control system in which the sensitive element is a thermocouple rather than a temperature responsive member. In Figure 2 also, a modified type of relay is employed in which the galvanometer clamping mechanism is operated by the secondary brake member, so that only a single driving cam need be employed.

Figure 2 shows a furnace 200 having a burner 201, to which fuel is supplied through a pipe 202, the supply of fuel being controlled by a valve 203. The valve 203 is provided with a stem 204, on which is mounted a rack 205. The rack 205 is operated by a pinion 206 driven by a motor 207 schematically indicated at 210. Motor 207 is provided with a pair of field windings 211 and 212 which control its rotation in opposite directions. Energization of windings 211 and 212 is controlled by switches 213 and 214, respectively.

A thermocouple 215 is mounted in the furnace 200 to measure its internal temperature. The terminals of the thermocouple 215 are connected to a potentiometric network 216 of conventional type, by means of a pair of conductors 217 and 218. The network 216 also includes a battery 220 connected to the terminal of a potentiometer resistance 221. A galvanometer 222 has a coil 223 connected to the conductor 218 and to one of the common terminals of the battery and the potentiometer resistance 221 by a conductor 224. The conductor 217 is connected to a slider 225 mounted on the stem 204 of valve 203 and movable along the potentiometer resistance 221 in accordance with the position of the valve.

The galvanometer 222 includes a permanent magnet 226, between the poles of which the coil 223 is suspended. Coil 223 carries a pointer 227, whose position is a measure of the current flowing through the galvanometer.

A sensitive relay mechanism 230 is provided to operate the switches 213 and 214 selectively in accordance with the position of the galvanometer pointer 227.

The sensitive relay mechanism 230 includes a secondary pointer 231, means for reciprocating the pointer 231 first into engagement with the pointer 227 and then into engagement with the switches 213 and 214, clamping mechanism for clamping the pointer 227 while it is engaged by the pointer 231, and braking mechanism for preventing movement of the pointer 231 with respect to its supporting arm during the time it engages the switches 213 and 214.

The entire sensitive relay mechanism 230, with the exception of the galvanometer 222, is supported on a plate schematically indicated at 232.

The galvanometer clamping mechanism includes a stationary bar 233 and a lever 234 pivoted as at 235 on the plate 232. A spring 236 biases the lever 234 for counterclockwise rotation about the pivot 235. Such counterclockwise rotation of lever 234 is limited by a stop 237 mounted on the plate 232. When the lever 234 is against the stop 237, it is free of the pointer 227, so that the latter can move under the influence of the galvanometer 222. The lever 234 also carries a downward extension 238, and is provided at its lower end with an adjustable bolt 240, which acts as a stop for a secondary brake arm 243.

Pivotally mounted on the plate 232 as at 241 are three arms: a forked arm 242, the secondary brake arm 243, and a supporting arm 244. One of the forks of the arm 242 carries a follower 245 which cooperates with a continuously rotating cam 246. A spring 247 attached to the arm 242 biases it for rotation about the pivot 241 in a clockwise direction, thereby tending to maintain the follower 245 in engagement with cam 246. The other fork of arm 242 carries a braking surface 250, and corresponds generally to the primary brake arm 54 of Figure 1. The secondary brake arm 243 is provided with a brake surface 251. A tension spring 252 connects the primary brake member and the secondary braking member 243, and biases them for movement toward each other. Another tension spring 253 connects the primary braking fork 249 with the supporting arm 244 and biases these two arms for movement towards each other.

A stop pin 254 is adjustably mounted in a slot 255 in the plate 232.

The upper end of secondary brake arm 243 is provided with an extension 256 for engagement with the stop member 240 which is mounted on extension 238 of lever 234.

The secondary pointer 231 comprises an elongated vertical portion and a lateral extension 257 which carries at its extremity a brake shoe 260 which is adapted to engage the braking surfaces 250 and 251.

Cam 246 is driven by a constant speed motor 261, having a winding 263 connected to suitable supply lines 264 and 265.

The motor 207 is supplied with power from the supply lines 264 and 265 through a transformer 266 having a primary winding 267 and a secondary winding 268.

Operation of Figure 2

When the parts are in the position shown in the drawings, the valve 203 is approximately half-way open, and the temperature within the furnace 200 is at the value which the system has been set to maintain. There is no potential across the terminals of the galvanometer 222, and hence the pointer 227 is in its center position.

The cam 246 is provided with a long slow rise portion 270, and an abrupt drop-off portion 271. The cam 246 is rotated clockwise as indicated by the arrow in the drawings. When the parts are in the positions shown, the follower 245 has moved a substantial distance up the rise portion 270, thereby moving the secondary pointer 231 towards the pointer 227. The extension 256 on secondary brake arm 243 has just engaged the stop bolt 240 on the clamping lever 234. As rotation of cam 246 continues, secondary brake member 243 is held by its engagement with the bolt 240, so that surface 251 separates from brake shoe 260. This extends spring 252 and compresses spring 236, rotating clamping lever 234 clockwise about its pivot 235 and clamping pointer 227 between the lever 234 and the bar 233. As the motion of the cam 246 continues, brake shoe 260 remains in engagement with braking surface 250 until the pointer 231 engages either the clamped pointer 227 or stop pin 254. Engagement of secondary pointer 231 with either of these latter members causes a tensioning of the spring 253 sufficient to release the pressure between brake shoe 260 and surface 250, thereby permitting secondary pointer 231 to rotate about its pivot. The secondary pointer 231 accordingly rotates about its pivot until it engages both stop pin 254 and the clamping pointer 227. The angular position of secondary pointer 231 with respect to its supporting arm 244 is then determined by the relative positions of these two members.

When the follower 245 approaches the end of riser portion 270, all the above described operations have been completed, and the secondary pointer 231 has been positioned in accordance with the position of clamped pointer 227.

When the follower 245 rides down the abrupt drop-off portion 271, the arms 242, 243, and 244 will be rotated rapidly clockwise by the spring 247. During this phase of the operation, the arm 242 will first move alone until the braking surface 250 engages the brake shoe 260. After this engagement, arms 242 and 244, together with secondary pointer 231, move as a unit. This motion continues until brake shoe 260 engages braking surface 251. Thereafter, the secondary brake member 243 will also move with the unit previously described. When brake shoe 260 engages brake surface 251, the extension 256 is moved to the right out of engagement with bolt 240. This permits spring 236 to rotate clamping lever 234 counter-clockwise, thereby freeing the galvanometer pointer 227.

As secondary pointer 231 moves to the right, it engages and operates the switches 213 and 214 selectively in accordance with the position of the galvanometer pointer 227. The operation is exactly analogous to that described in connection with Figure 1.

The energizing circuit for winding 211 may be traced from the upper terminal of transformer secondary winding 268 through a conductor 270, switch 213, conductors 271 and 272, winding 211, and a conductor 273 to the lower terminal of secondary winding 268.

The energizing circuit for winding 212 may be traced from the upper terminal of winding 268 through conductor 270, switch 214, conductors 274 and 275, winding 212, and conductor 273 to the lower terminal of transformer winding 268. A condenser 276 is connected between conductors 271 and 274 to reduce sparking at the contacts of switches 213 and 214.

Figure 3:
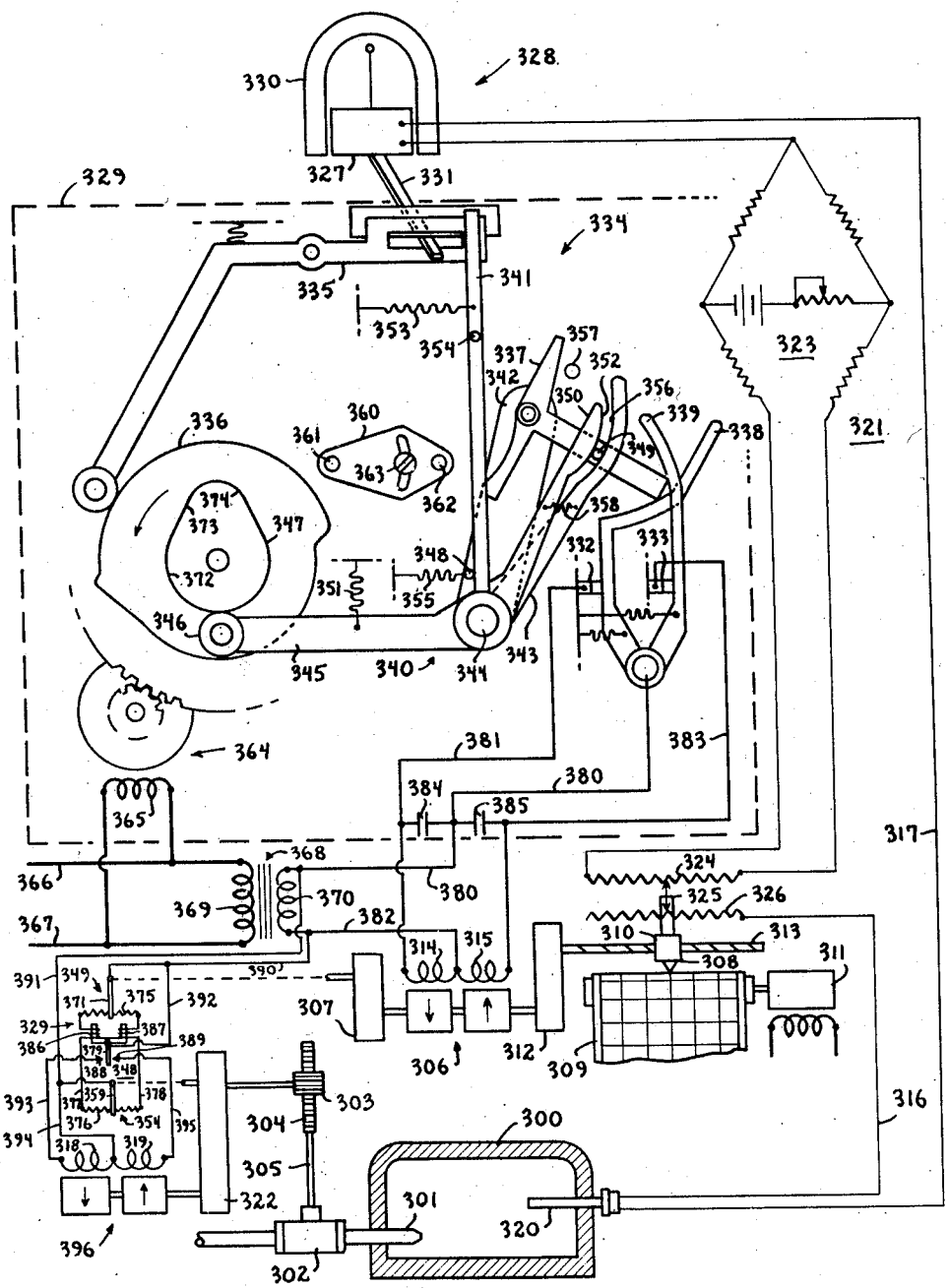
Figure 3 is a somewhat diagrammatic view of a control and recording system embodying still another embodiment of my invention.

*Figure 3*

Figure 3 shows a system in which a somewhat different type of potentiometric network is employed. This may be, for example, the Brown potentiometric network disclosed in the patent to Thomas R. Harrison, No. 1,898,124, dated February 21, 1933. In this figure also, a different type of sensitive relay mechanism is employed, in which the modulation of the contact timing in accordance with the angular position of the secondary pointer is obtained from the shape of the contacts themselves rather than from the speed of operation of the secondary pointer.

Figure 3 shows a furnace 300 having a burner 301. The supply of fuel to the burner 301 is controlled by a valve 302. A motor 396 operates the valve 302 through a gear train schematically indicated at 322 which is connected to a pinion 303 operating a rack 304 mounted on the stem 305 of the valve 302. Motor 396 is provided with a pair of field windings 318 and 319, which control its operation in opposite directions. Energization of windings 318 and 319 is controlled by a balanced relay 329, which responds to the occurrence of an unbalance in a normally balanced network 348, which includes a control potentiometer 349 and a rebalancing potentiometer 354. Slider 359 of rebalancing potentiometer 354 is driven by motor 396 through gear train 322. Slider 371 of control potentiometer 349 is driven by another motor 306 through a gear train 307.

In the network 348, the slidewires 375 and 376 of the potentiometers 349 and 354, respectively have their left-hand terminals connected by a conductor 377 and their right-hand terminals connected by a conductor 378. The conductors 377 and 378 include opposing windings 386 and 387 of the balanced relay 329. The relay 329, which may preferably be of the type described in Patent No. 2,169,141, issued to Willis H. Gille on August 8, 1939, operates a switch arm 375 between a pair of contacts 388 and 389. Energy is supplied to the network 348 through a conductor 390 attached to slider 371, and a conductor 391 attached to slider 359. The conductors 390 and 391 are connected to a secondary winding 370 of a transformer 368.

Motor 306 also drives, in addition to control potentiometer 349, a recorder pen 308 across a chart 309, the chart being driven by a constant speed motor 311. The connection from the motor 306 to the pen 308 is through another gear train schematically indicated as 312 to a screwshaft 313 on which moves a carriage 310 supporting the pen 308. Motor 306 is provided with a pair of field windings 314 and 315 which control its operation in opposite directions.

A thermocouple 320 is mounted in the furnace 300 and is connected by a pair of conductors 316 and 317 to the terminals of a potentiometric network 321. The network 321 consists of a bridge circuit 323 which operates as a source of potential and includes a slide-wire resistance 324. A dual slider 325 is mounted on the pen carriage 310 and carries one contact which engages the slide-wire 324 and another contact which engages a rheostat 326 connected in series with the thermocouple 320 and a galvanometer coil 327 on the galvanometer 328. The purpose of the rheostat 326 is to keep the resistance of the network 321, as measured from the thermocouple terminals, substantially constant for all positions of slider 325 with respect to potentiometer resistance 324.

The galvanometer 328 includes the usual permanent magnet 330 and a pointer 331 carried by the moving coil 327.

The energization of motor windings 314 and 315 is controlled by switches 332 and 333, respectively. The switches 332 and 333 are operated selectively by a sensitive relay mechanism 334 in accordance with the position of the galvanometer pointer 331.

The relay mechanism 334 includes a galvanometer clamping lever 335 which is operated by a continuously rotating cam 336. Since the construction and operation of cam 336 and lever 335 is entirely analogous to that of a cam 56 and lever 50 of Fig. 1, further explanation of this structure is believed to be unnecessary.

The sensitive relay mechanism 334 also includes an arrangement for reciprocating a secondary pointer 337 between a first position where it engages the galvanometer pointer 331 and a second position where it engages members 338 and 339 which actuate the switches 332 and 333, respectively.

The mechanism which reciprocates the secondary pointer 337 comprises four arms 340, 341, 342, and 343, all pivoted at 344 to the supporting plate 329.

The arm 340 is a driving and primary brake arm. It takes the form of a bell-crank lever having one extension 345 carrying a follower 346 which is driven by a cam 347, and another extension 350 which serves as a primary brake arm. A spring 351 biases arm 345 of lever 340 upwardly so as to maintain the follower 346 in engagement with cam 347. The primary brake arm 350 has a brake surface 352.

The arm 341 serves as an intermediate pointer between the galvanometer pointer 331 and the secondary pointer 337. Its purpose is to take part of the strain off the galvanometer pointer 331 when the secondary pointer 337 is being positioned. A tension spring 353 biases the intermediate pointer 341 for movement to the left and into engagement with galvanometer pointer 331. Such engagement is prevented, however, by a stop pin 348 carried by supporting arm 342. The pointer 341 carries a stop pin 354 which is adapted to engage the upper end of the secondary pointer 337.

The arm 342 is a supporting arm for the secondary pointer 337. A spring 355 shown as attached to pin 348 biases the supporting arm 342 for counter-clockwise rotation about the pivot 344.

The arm 343 is the secondary brake arm and has near its free end a braking surface 356. The free end of arm 343 is extended so as to engage a stop 357 mounted on the plate 329 when the secondary pointer is near the left end of its travel. A tension spring 358 biases the brake arm 343 and 350 for movement towards each other.

A plate 360 is pivotally mounted on the plate 329 as at 361. The plate 360 carries a stop pin 362. The plate 360 may be adjusted in any predetermined angular position with respect to the plate 329 by means of a pin and slot connection 363.

Cams 336 and 347 are mounted on a common shaft which is driven by a constant speed motor 364. The motor 364 is provided with a winding 365 connected to suitable power supply lines 366 and 367.

Power is supplied to motor 306 from lines 366 and 367 through a transformer 368 having a primary winding 369 and a secondary winding 370.

Operation of Figure 3

The operation of the relay mechanism 334 will first be briefly described. When the parts are in the position shown in the drawings, the secondary pointer 337 is at its right-hand limit of movement. It is maintained in this same position for a time dependent on the length of a low dwell portion 372 of cam 347.

As cam 347 rotates counter-clockwise, as indicated by the legend in the drawings, the follower 346 moves up a riser portion 373 and down a drop-off portion 374, returning to the low dwell portion 372.

When the follower 346 moves up the riser portion 373, the arm 340 is rotated counter-clockwise about the pivot 344. The secondary brake arm 343 follows this movement until its upper end engages the stop 357. The supporting arm 342 also follows this movement under the influence of the biasing spring 355. This movement of arm 342, carrying stop pin 348 to the left, permits intermediate pointer 341 to move to the left until it engages galvanometer pointer 331. It thereupon stops, setting a position of pin 354 dependent on the position of pointer 331. When the secondary pointer 337 engages either stop 362 or stop 354, the pressure between the braking surface 352 and braking pin 349 on pointer 337 is released. This permits secondary pointer 337 to rotate about its pivot on supporting arm 342 until it engages both stops 354 and 362. The angular position of secondary pointer 337 with respect to its supporting arm 342 is thereby determined in accordance with the position of the clamped galvanometer pointer 331.

When the follower 346 moves down the drop-off portion 374 of cam 347, the brake arm 350 moves back to the right. When braking surface 352 engages brake shoe 349 on secondary pointer 337, it forces pointer 337 and supporting arm 342 to follow its motion to the right. As this motion continues, the intermediate pointer 341 is carried to the right out of engagement with pointer 331 by the action of the stop pin 348. Also, the cam 336 operates on the lever 335 to free the galvanometer pointer 331.

As the motion of secondary pointer 337 to the right continues, pin 349 engages braking surface 356 on the secondary brake member 343. The pin 349 is then securely clamped between the two brake members.

As pointer 337 approaches the right-hand end of the path of movement, it engages one of the switch operating members 338 and 339, depending upon its angular position with respect to the supporting arm 342.

Switch 332 controls an energizing circuit for winding 314 of motor 306. This circuit may be traced from the upper terminal of transformer secondary winding 370 through a conductor 380, switch actuator 338, switch 332, a conductor 381, motor winding 314, and a conductor 382 to the lower terminal of secondary winding 370.

Switch 333 controls an energizing circuit for winding 315 of motor 306. This circuit may be traced from the upper terminal of transformer secondary winding 370 through conductor 380, switch actuator 339, switch 333, a conductor 383, motor winding 315, and conductor 382 to the lower terminal of transformer winding 370.

A condenser 384 is connected across the contacts of switch 332, and a condenser 385 is connected across the contacts of switch 333, for spark prevention purposes.

The switch actuating members 338 and 339 are provided with curved portions which are engaged by the secondary pointer 337. These curved portions extend obliquely toward the secondary pointer 337, so that as the angular deflection of pointer 337 from its normal position increases, the period of its engagement of the switch actuator 338 or 339 also increases. It will therefore be understood that the switches 332 and 333 are intermittently operated for periods of time which are modulatingly varied in accordance with the deflection of the galvanometer 331 from its center position.

It may be stated that the right-hand end of secondary pointer 337, which engages the switch actuators 338 and 339, is reciprocated along one of a plurality of concentric arcuate paths. These paths have a common center at the pivot 344. A change in the angular position of secondary pointer 337 with respect to its supporting arm 342 causes the right-hand end of the secondary pointer to shift from one of these paths to another of different radius. The switch actuators 338 and 339 extend obliquely to these paths, so that the period of engagement of pointer 337 with either of the actuators 338 or 339 depends upon the particular path in which pointer 337 is moved. Likewise, the particular actuator engaged by the pointer 337 is determined by the selection of a particular path. The selection of one of these concentric paths is made in accordance with the magnitude of a controlling condition, as reflected in the position of galvanometer pointer 331, by the sensitive relay mechanism described.

Energization of either winding 314 or 315 of motor 306 causes rotation of that motor so as to drive the screw shaft 313 in the proper direction to move slider 325 so as to rebalance the network 323. At the same time, the pen 308 moves across the chart 309 and records thereon the change in temperature which causes operation of motor 306 to be initiated.

At the same time, operation of motor 306 causes slider 371 to be driven across slidewire 375 so as to unbalance the network 348. When the sliders 371 and 359 are in their center position, as shown in the drawings, the network 348 is balanced, since the current flowing through coil 386 of relay 329 is the same as the current flowing through coil 387. At such a time, therefore, the switch arm 379 remains between the contacts 388 and 389, not engaging either one.

When the slider 371 moves to the left from the center position shown in the drawings, the current flow through relay coil 386 is increased since the resistance connected in series with it is decreased. On the other hand, the current flowing through relay coil 387 is decreased, because the resistance connected in series with it is increased.

This unbalance in the energization of coils 386 and 387 causes switch arm 379 to be moved against contact 388, thereby completing an energizing circuit for winding 318 of motor 396. This circuit may be traced from the lower terminal of transformer secondary winding 370 through conductors 390 and 392, switch arm 379, contact 388, a conductor 393, winding 318, and conductors 394 and 391 to the upper terminal of transformer secondary winding 370.

Energization of motor winding 318 causes motor 396 to rotate in the proper direction to change the position of valve 302 so as to restore the temperature adjacent the sensitive element 20 to its desired value. At the same time, slider 359 of rebalancing potentiometer 354 is moved to the right along slidewire 376. This motion of valve 302 and of slider 359 continues until the slider 359 has reached a position where the balanced condition of the network 348 is restored. When such a balanced condition is reached, the switch arm 379 again assumes a position midway between contacts 388 and 389, thereby deenergizing winding 318 of motor 396.

It will be readily understood that when network 348 is unbalanced in the opposite sense, switch arm 379 is moved into engagement with contact 389, thereby completing an energizing circuit for winding 319 of motor 396. This energizing circuit may be traced from the lower terminal of transformer secondary winding 370 through conductors 390 and 392, switch arm 379, contact 389, a conductor 395, winding 319, and conductors 394 and 391 to the upper terminal of transformer secondary winding 370.

The system shown in Figure 3 therefore operates upon a change in temperature adjacent the thermocouple 320, to make a record of that change upon the chart 309, and simultaneously to correct the position of the valve 302 so as to restore the temperature to its desired value.

Figure 4

Figure 4:
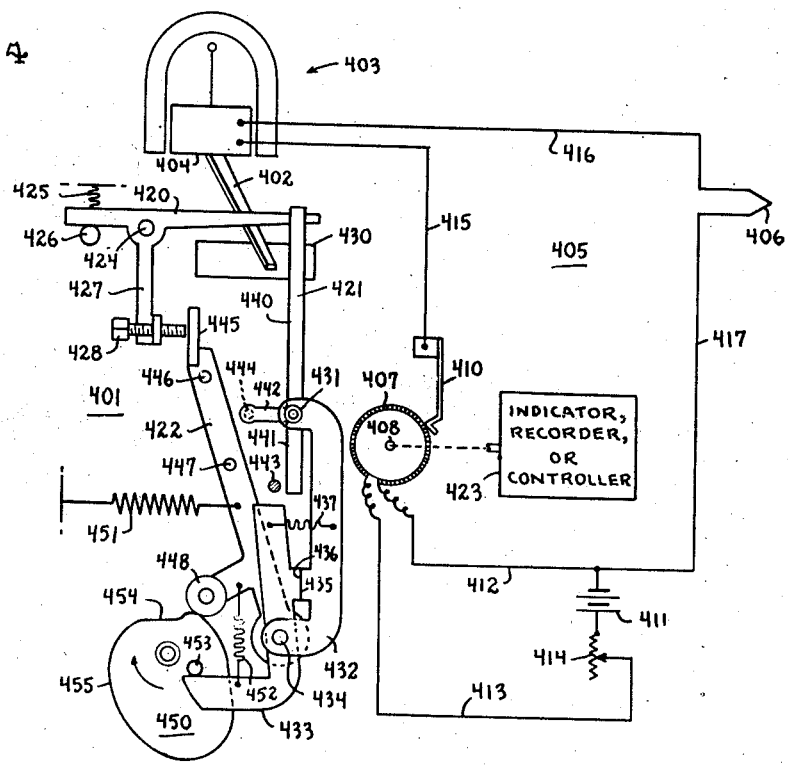
Figure 4 is a somewhat diagrammatic view of a modified form of control and/or recording apparatus embodying my invention.

I have illustrated in Figure 4, a modification of my invention wherein a rebalancing potentiometer in a control network is actuated mechanically by my sensitive relay mechanism, rather than by a reversible electrical motor controlled by the relay mechanism.

In Figure 4 a sensitive relay mechanism, generally indicated at 401 is operated in accordance with the position of a pointer 402 of a galvanometer 403. The galvanometer 403 includes a movable coil 404 carrying the pointer 402. Coil 404 is connected in a potentiometric network 405 including a thermocouple 406 and a rebalancing slide-wire 407.

The slide-wire 407 is circular in form, and is rotatable about a shaft 408. A stationary slider 410 cooperates with the slide-wire 407.

The network 405 includes a battery 411 connected to the terminals of slide-wire 407 through conductors 412 and 413. A rheostat 414 is included in the connections between battery 411 and slide-wire 407 in order to adjust the control point of the system. Slider 410 is connected to one terminal of galvanometer coil 404 through a conductor 415. The other terminal of coil 404 is connected to one terminal of thermocouple 406 by a conductor 416. A conductor 417 connects the opposite terminal of thermocouple 406 with conductor 412.

The sensitive relay mechanism 401 includes a clamping lever 420, which is periodically operated to clamp the galvanometer pointer 402, a secondary pointer 421 which is periodically reciprocated between a position where it engages pointer 402 and another position where it frictionally engages slide-wire 407, and a driving arm 422, which drives secondary pointer 421 while it is in engagement with slide-wire 407, so as to cause rotation of shaft 408. As indicated in the drawings, the shaft 408 may be operatively connected with any suitable indicating, recording, or controlling mechanism 423.

The clamping lever 420 is pivotally mounted, as at 424, to a fixed support. The lever 420 is biased by a compression spring 425 to rotate counter-clockwise against a stop 426. A downwardly extending arm 427 of lever 420 carries at its lower extremity a bolt 428. The bolt 428 may be threadedly adjustable with respect to the arm 427. A fixed bar 430 is mounted on the opposite side of pointer 402 from clamping lever 420, so that the pointer 402 may be clamped between the lever 420 and bar 430.

The secondary pointer 421 is carried by a slip friction pivot arrangement 431 at the extremity of a supporting arm 432. The supporting arm 432, the driving arm 422, and a bell-crank lever 433 are all pivotally mounted on a fixed support, as at 434. Supporting arm 432 and the bell-crank lever 433 are provided with suitable mating surfaces, as at 435 and 436, respectively. A tension spring 437 has its extremities fastened to the arm 432 and lever 433 in such a manner as to maintain the surfaces 435 and 436 in engagement. The spring 437 serves as a strain release to permit separation of surfaces 435 and 436 during operation of the relay mechanism.

The secondary pointer 421 is substantially T shaped and comprises an upwardly extending arm 440, a downwardly extending arm 441, and a laterally extending arm 442. The upwardly extending arm 440 is adapted to engage the galvanometer pointer 402. The downwardly extending arm 441 is adapted to engage a stationary stop 443, which may be supported on a bracket (not shown) extending in front of the driving arm 422 so as not to interfere with the movement thereof. The laterally extending arm 442 carries on the underside of its extremity a pin 444 adapted to engage the surface of slide-wire 407.

The driving arm 422 carries at its upper end an extension 445 adapted to engage the bolt 428 mounted on lever 420, and thereby operate the clamping lever 420. The lever 422 also carries a pair of pins 446 and 447 which drivingly engage the secondary pointer 421. The arm 422 carries a follower 448 adapted to engage a continuously rotating cam 450. A tension spring 451 biases arm 422 so as to maintain the follower 448 in engagement with cam 450. A tension spring 452 connects driving arm 422 and the lower end of bell-crank lever 433. The spring 452 tends to rotate the bell-crank lever clockwise so as to cause engagement between pin 444 and slide-wire 407. The cam 450 carries a pin 453 which is adapted to engage the lower end of bell-crank lever 433 and rotate it counter-clockwise against the bias of spring 452.

Operation of Figure 4

When the parts are in the position shown in the drawings, the galvanometer pointer 402 is about to be clamped by the lever 420. The cam 450 rotates clockwise, as indicated by the legend in the drawings. In the position shown, the follower 448 is about to enter into engagement with a low dwell portion 454 of the cam 450. As the follower 448 engages the low dwell portion 454, the driving arm 422 is permitted to move to the left under the influence of biasing spring 451, thereby causing engagement of extension 445 with bolt 428 attached to clamping lever 420. When extension 445 engages bolt 428, lever 420 is rotated in a clockwise direction about its pivot, and engages pointer 402 clamping it against the bar 430. At the same time, pin 453 moves counter-clockwise and causes bell-crank lever 433 to be turned counter-clockwise on the pivot 434. During this counter-clockwise movement of bell-crank lever 433, spring 437 causes supporting arm 432 and secondary pointer 431 to follow until the arms 440 and 441 of pointer 421 engage the galvanometer pointer 402, and the stop 443, respectively. It will of course be understood that the engagement of arm 440 with galvanometer pointer 402 will not take place exactly simultaneously with the engagement of arm 441 and stop 443, but that one of these engagements will take place before the other, depending upon the position of pointer 402 and the previous position of secondary pointer 421 with respect to arm 432. After one of these engagements take place, further counter-clockwise movement of supporting arm 432 causes secondary pointer 421 to rotate about the slip friction pivot 431 until the other engagement takes place. After arm 440 has engaged pointer 402, and arm 441 has engaged stop 443, further counter-clockwise rotation of bell-crank lever 433 will merely cause separation of surfaces 435 and 436 and tensioning of strain release spring 437. It will be seen that this operation establishes the secondary pointer 421 in an angular position with respect to the suppporting arm 432 which is determined by the position of galvanometer pointer 402.

As clockwise rotation of cam 450 continues, follower 448 passes over the low dwell portion 454 and engages the riser portion 455. This causes rotation of driving arm 422 in a clockwise direction against the tension of spring 451. At approximately the same time, the pin 453 moves out of engagement with the lower end of bell-crank lever 433, permitting the latter to rotate clockwise under the influence of spring 452. Since the clockwise rotation of bell-crank lever 433 is unopposed, it takes place at a relatively rapid rate, and continues until pin 444 engages the surface of slide-wire 407. Slide-wire 407 may preferably be constructed so that the surface engaged by pin 444 is different from the electrically conductive part of the surface engaged by slider 410.

As driving arm 422 moves in a clockwise direction, the extension 445 passes out of engagement with bolt 428, and spring 425 is then effective to cause counter-clockwise movement of clamping lever 420, thereby releasing galvanometer pointer 402. The parts are so proportioned that when pin 444 engages the surface of slide-wire 407, the pivot 431 on supporting arm 432 will be exactly in line with shaft 408 of slide-wire 407. The surfaces of pin 444 and slide-wire 407 are frictional in character so that the engagement between them is quite positive. This engagement is made more positive by the tensioning of spring 452 as driving arm 422 continues to rotate clockwise after the motion of bell-crank lever 433 has been stopped by engagement of pin 444 with slide-wire 407. Clockwise motion of driving arm 422 continues until either pin 446 or 447 engages arm 440 or 441 of secondary pointer 421. The particular pin to engage pointer 421 is determined by the angular position of secondary pointer 421 with respect to supporting arm 432. If galvanometer pointer arm 402 was clamped in the center of its range of travel, secondary pointer arm 421 will be at a central position with respect to supporting arm 432, and the arms 440 and 441 will both be barely engaged by the pins 446 and 447 when the driving arm 422 is at the extremity of its range of movement to the right.

If the galvanometer pointer 402 is clamped at a point to the left of the position shown in the drawings, the secondary pointer 421 will be displaced in a counter-clockwise direction from its central position with respect to supporting arm 432. In this condition, the pin 446 will engage arm 440 when the driving arm moves to the right, and will rotate secondary pointer 421 back to its normal position. Since at this time, the pin 444 is frictionally engaging the surface of slide-wire 407, the slide-wire 407 will likewise be rotated in a clockwise direction by an amount corresponding to the deflection of galvanometer pointer 402 from its central position.

If, on the other hand, the pointer 402 is deflected to the right from the position shown in the drawings, the position assumed by the secondary pointer 421 will be displaced in a clockwise direction from its central position with respect to supporting arm 432, and the arm 441 will be engaged by pin 447 as the driving arm 422 moves to the right. Pin 447 will drive secondary pointer 421 back to its normal position with respect to supporting arm 432, and through the frictional connection between pin 444 and slide-wire 407, the latter will be rotated counter-clockwise by an amount corresponding to the deflection of galvanometer pointer 402 from its center position.

When the network 405 is balanced, the E. M. F. supplied by the thermocouple 406 is substantially equal to the potential drop across that portion of slide-wire 407 between slider 410 and the conductor 412. Under these conditions, no current flows through galvanometer coil 404, and pointer 402 is therefore at its center position. Upon a change in temperature adjacent the thermocouple 406, the changed thermocouple E. M. F. unbalances the network, and a flow of current takes place through galvanometer coil 404, causing a deflection of pointer 402. The sensitive relay mechanism 401 then rotates slide-wire 407 by an amount and in a direction proportional to the deflection of pointer 402, thereby changing the potential which is balanced against the E. M. F. of thermocouple 406 so as to restore the network 405 to a condition of balance.

Rotation of slide-wire 407 also rotates shaft 408, which may be connected by suitable electrical or mechanical means to any desired indicating, recording, or controlling apparatus. For example, the shaft 408 could operate a potentiometer in a control network such as the potentiometer 349 in network 348 of Figure 3.

While I have shown and described certain preferred embodiments of my invention, other modifications thereof will readily occur to those skilled in the art, and I therefore wish it to be understood that my invention is limited only by the appended claims.

I claim as my invention:

1. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, and motor means for reciprocating said brake means into and out of engagement with said operator, said motor means being effective upon continued movement thereof after engagement of said brake means with said operator to transmit motion to said support through said brake means and said operator, so that said operator is moved into engagement with said control member.

2. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, said brake means comprising a first brake member adapted to engage a first portion of said operator and a second brake member adapted to engage a second portion of said operator, said first and second portions being in opposed relation so that said operator is clamped between said brake members when both are engaging the operator, and motor means for operating said brake means and reciprocating said support so as to sequentially release said brake means, engage said operator with said positioning means, apply said brake means, and engage said operator with said control member.

3. In a sensitive relay mechanism, in combination, a galvanometer pointer, means for deflecting said pointer in accordance with the value of a controlling condition, means for clamping said pointer, a member for performing a control function, an operator for engaging said member so as to cause it to perform said control function, a support for said operator, brake means for preventing movement of said operator with respect to said support, said brake means comprising a first brake member adapted to engage a first portion of said operator and a second brake member adapted to engage a second portion of said operator, said first and second portions being in opposed relation so that said operator is clamped between said brake members when both are engaging the operator, one of said brake members having an extension for engaging said clamping means, engagement of said extension and said clamping means serving to release said brake member and clamp said pointer, and motor means for operating said brake means, and reciprocating said support so as to sequentially clamp said pointer, release said brake means, engage said operator with said clamped pointer, apply said brake means, unclamp said pointer, and engage said operator with said control member.

4. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, means biasing said support so as to engage said operator with said positioning means, and motor means for reciprocating said brake means into and out of engagement with said operator, said motor means being effective to drive said brake means after its engagement with said operator so as to transmit motion to said support through said brake means and said operator, thereby causing engagement of said operator with said control member, said motor means comprising a cam and a follower therefor associated with said brake means, said cam being shaped to control the rate of change of position of said follower so that the period of engagement of said operator with said control member is a function of the position of the operator with respect to the support.

5. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, means biasing said support so as to engage said operator with said positioning means, and motor means for reciprocating said brake means into and out of engagement with said operator, said motor means being effective to drive said brake means after its engagement with said operator so as to transmit motion to said support through said brake means and said operator, thereby causing engagement of said operator with said control member, said motor means comprising a cam and a follower therefor associated with said brake means, said control member having a portion of its contour oblique with respect to the path of movement of the operator, so that the period of engagement of said operator with said control member is a function of the position of the operator with respect to its support.

6. In a sensitive relay mechanism, in combination, a member for performing a control function, an operator for engaging said member so as to cause it to perform said control function, a movable support for said operator, means for positioning said operator with respect to said support in accordance with a controlling condition, means for reciprocating said support so as, to cause engagement of said operator with said control member, said control member having a portion of its contour oblique with respect to the path of movement of the operator, so that the period of engagement of said operator with said control member is a function of the position of the operator with respect to its support.

7. In a sensitive relay mechanism, in combination, a galvanometer pointer, means for deflecting said pointer in accordance with the value of a controlling condition, means for clamping said pointer, a member for performing a control function, an operator for engaging said member so as to cause it to perform said control function, a secondary pointer, and motor means for driving said clamping means, said secondary pointer, and said operator so as to sequentially clamp said galvanometer pointer, position said secondary pointer in accordance with the position of said clamped pointer, position said operator in accordance with the position of said secondary pointer, unclamp said galvanometer pointer and drive said operator into engagement with said control member.

8. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, a strain release connection between said brake means and said support, said positioning means serving as a stop for said operator and said support, said brake means being released from said operator when said operator engages said positioning means, and motor means including said brake means for driving said operator into engagement with said control member.

9. In a sensitive relay mechanism, in combination, a galvanometer pointer, means for deflecting said pointer in accordance with the value of a controlling condition, means for clamping said pointer, a member for performing a control function, an operator for engaging said member so as to cause it to perform said control function, a movable support for said operator, brake means for preventing movement of said operator with respect to said support, means attached to said brake means for engaging said clamping means so as to clamp said pointer and simultaneously release said brake means, and motor means for operating said brake means and reciprocating said support so as to sequentially clamp said pointer, release said brake means, engage said operator with said clamped pointer, apply said brake means, unclamp said pointer, and engage said operator with said control member.

10. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, and motor means for reciprocating said brake means so as to drive the brake means into engagement with the operator and thereafter move the brake means, operator and support as a unit, said motor means comprising a single cam and a follower therefor attached to said brake means, said motor means and said brake means cooperating upon continuous movement of said cam to sequentially release said brake means from said operator, engage said operator with said positioning means, apply said brake means, and engage said operator with said control member.

11. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, and motor means for reciprocating said brake means so as to drive the brake means into engagement with the operator and thereafter move the brake means, operator, and support as a unit, strain release means supporting said control member so as to permit movement of the control member when engaged by the operator, said motor means operating at a predetermined speed so that the time of engagement of the operator and the control member is a function of the position of the operator with respect to the support.

12. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, said brake means comprising a first brake member adapted to engage a first portion of said operator and a second brake member adapted to engage a second portion of said operator, said first and second portions being in opposed relation so that said operator is clamped between said brake members when both are engaging the operator, and motor means for reciprocating said brake means so as to drive the brake means into engagement with the operator and thereafter move the brake means, operator and support as a unit, said motor means comprising a single cam and a follower therefor attached to one of said brake members, said motor means and said brake means cooperating upon continuous movement of said cam to sequentially release said brake means from said operator, engage said operator with said positioning means, apply said brake means, and engage said operator with said control member.

13. In a sensitive relay mechanism, in combination, a member for performing a control function, an operator for engaging said member so as to cause it to perform said control function, a movable support for said operator, means for positioning said operator with respect to said support in accordance with a controlling condition, brake means for preventing movement of said operator with respect to said support, said brake means comprising a first brake member adapted to engage a first portion of said operator and a second brake member adapted to engage a second portion of said operator, said first and second portions being in opposed relation so that said operator is clamped between said brake members when both are engaging the operator, means biasing said second brake member into engagement with said operator, stop means for limiting movement of said second brake member, and motor means for reciprocating said first brake member so as to drive the first brake member into engagement with the operator and thereafter move the first brake member, operator, and support as a unit, said unit moving thereafter so that said operator engages said second brake member and moves the second brake member with said unit, said motor means and said brake means cooperating to sequentially release said brake means from said operator, engage said operator with said positioning means, apply said brake means, and engage said operator with said control member.

14. In a sensitive relay mechanism, in combination, a galvanometer pointer, means for deflecting said pointer in accordance with the value of a controlling condition, means for clamping said pointer, a member for performing a control function, an operator for engaging said member so as to cause it to perform said control function, means for positioning said operator in accordance with the position of the clamped pointer, and means for reciprocating said operator between the positioning means and the control member so as to cause engagement of the operator and control member for a period of time dependent upon the operator position, said positioning means comprising a pivotal support for said operator carried by said reciprocating means, said pointer, and a stationary stop for engaging a portion of said operator spaced from said pointer.

15. In a sensitive relay mechanism, in combination, a member for performing a control function, an operator for engaging said member so as to cause it to perform said control function, means for reciprocating said operator along an arcuate path, means for varying the radius of said path in accordance with a controlling condition, said control member having a portion of its contour oblique with respect to the paths of movement of the operator, so that the period of engagement of the operator with the control member is a function of the radius of said path.

16. In a sensitive relay mechanism, in combination, a member for performing a control function, an operator for engaging said member so as to cause it to perform said control function, means for reciprocating said operator along one of a plurality of concentric arcuate paths so as to cause engagement of said operator and said control member, and means for shifting said operator from one to another of said paths in accordance with a controlling condition, said control member having a portion of its contour oblique with respect to said paths of movement, so that the period of engagement of the operator with the control member is determined by the particular path in which the operator is reciprocated.

17. In a sensitive relay mechanism, in combination, a member for performing a control function, an operator for engaging said member so as to cause it to perform said control function, strain release means supporting said control member so as to permit movement of the control member when engaged by the operator, means for reciprocating said operator along one of a plurality of concentric arcuate paths so as to cause engagement of said operator and said control member, and means for shifting said operator from one to another of said paths in accordance with a controlling condition, said control member having a portion of its contour oblique with respect to said paths of movement, so that the period of engagement of the operator with the control member is determined by the particular path in which the operator is reciprocated.

18. In a sensitive relay mechanism, in combination, a plurality of members for performing different control functions, an operator for selectively engaging one of said members so as to cause it to perform its control function, strain release means supporting each of said members so as to permit movement thereof when engaged by said operator, means for reciprocating said operator along one of a plurality of concentric paths, means supporting said control members so that a portion of each lies in at least one of said paths, and means for shifting said operator from one to another of said paths so as to selectively operate said control members.

19. In a sensitive relay mechanism, in combination, a member for performing a control function, an operator for engaging said member so as to cause it to perform said control function, a movable support for said operator, pointer means variable in position in accordance with a controlling condition, and means for reciprocating said support between said pointer means and said control member so as alternately to position said operator with respect to said support in accordance with the position of said pointer means and then to move said operator to engage said control member, said reciprocating means including a driving arm and strain release spring means connecting said support and said arm so as to cause said support to move in unison with said arm, but to permit separation of said support from said arm when movement of said support is limited by engagement of said operator and said pointer means.

20. In a sensitive relay mechanism, in combination, a member for performing a control function, an operator for engaging said member so as to cause it to perform said control function, a movable support for said operator, pointer means variable in position in accordance with a controlling condition, means for reciprocating said support between said pointer means and said control member so as alternately to position said operator with respect to said support in accordance with the position of said pointer means and then to move said operator to engage said control member, said reciprocating means including a driving arm and strain release spring means connecting said support and said arm so as to cause said support to move in unison with said arm, but to permit separation of said support from said arm when movement of said support is limited by engagement of said operator and said pointer means, cam means for operating said driving arm in one direction, and spring means for operating said driving arm in the opposite direction.

21. In a sensitive relay mechanism, in combination, a movable member for performing a control function and for varying the resistance in an electrical circuit, an operator for engaging said member so as to cause it to perform said control function and vary said resistance, a movable support for said operator, pointer means variable in position in accordance with a controlling condition, and means for reciprocating said support between said pointer means and said control member so as alternately to position said operator with respect to said support in accordance with the position of said pointer means and then to move said operator to engage said control member, said reciprocating means including a driving arm and strain release spring means connecting said support and said arm so as to cause said support to move in unison with said arm, but to permit separation of said support from said arm when movement of said support is limited by engagement of said operator and said pointer means.

22. In a sensitive relay mechanism for operating a control device in accordance with the position of a galvanometer pointer, in combination, means for periodically clamping said pointer, a secondary pointer having a portion adapted to mechanically engage said control device, a support for said secondary pointer, means for reciprocating said support between said galvanometer pointer and said control device so as alternately to position said secondary pointer with respect to said support in accordance with the position of said galvanometer pointer and then to move said portion of said secondary pointer into engagement with said control device, and driving means operative while said portion engages said control device to change the position of said secondary pointer with respect to said support, and thereby operate said control device through said mechanical engagement.

THOMAS R. HARRISON.